United States Patent
Herzog et al.

(10) Patent No.: US 9,739,178 B2
(45) Date of Patent: Aug. 22, 2017

(54) STEAM RANKINE PLANT

(71) Applicant: ALSTOM Technology Ltd, Baden (CH)

(72) Inventors: Maurus Herzog, Schinznach Dorf (CH); Suman Ray, Wettingen (CH)

(73) Assignee: General Electric Technology GmbH, Baden (CH)

( * ) Notice: Subject to any disclaimer, the term of this patent is extended or adjusted under 35 U.S.C. 154(b) by 565 days.

(21) Appl. No.: 13/900,112

(22) Filed: May 22, 2013

(65) Prior Publication Data

US 2013/0312416 A1 Nov. 28, 2013

(30) Foreign Application Priority Data

May 25, 2012 (EP) .................................... 12169421

(51) Int. Cl.
*F01K 7/22* (2006.01)
*F01K 3/18* (2006.01)
*F01K 7/24* (2006.01)

(52) U.S. Cl.
CPC ................ *F01K 3/18* (2013.01); *F01K 7/223* (2013.01); *F01K 7/24* (2013.01); *Y02E 10/46* (2013.01)

(58) Field of Classification Search
CPC ......... Y02E 10/46; Y02E 20/12; Y02E 20/14; Y02E 20/16; Y02E 20/18; F01D 17/105; F01D 19/02; F01K 3/22; F01K 3/265; F01K 7/22; F01K 7/223; F01K 7/24; F01K 7/40; F01K 13/02; F01K 13/025; F01K 23/10; F01K 23/106; F01K 23/16; F01K 25/08; F01K 17/00; F22G 5/18

USPC ............. 60/39.182, 646, 653, 663, 670, 679
See application file for complete search history.

(56) References Cited

U.S. PATENT DOCUMENTS

| | | | |
|---|---|---|---|
| 3,923,009 A | 12/1975 | Sohma | |
| 4,598,551 A | 7/1986 | Dimitroff, Jr. et al. | |
| 6,220,014 B1 * | 4/2001 | Wada ............. | F01K 13/025 60/39.182 |
| 2010/0071366 A1 | 3/2010 | Klemencic | |
| 2011/0247329 A1 | 10/2011 | Goto et al. | |

FOREIGN PATENT DOCUMENTS

| | | | |
|---|---|---|---|
| DE | 10227709 A1 | 2/2003 | |
| EP | 2264287 A1 | 12/2010 | |
| EP | 2385223 A1 | 11/2011 | |
| JP | 52143306 A | 11/1977 | |
| JP | 61138885 | 6/1986 | |
| JP | 2005299644 | 10/2005 | |
| JP | EP 2444596 A2 * | 4/2012 | ............. F01K 7/223 |

OTHER PUBLICATIONS

European Search Report for Application 12169421.0, dated Nov. 7, 2012.

* cited by examiner

*Primary Examiner* — Jonathan Matthias
(74) *Attorney, Agent, or Firm* — GE Global Patent Operation; Cynthia W. Flanigan

(57) ABSTRACT

The invention relates to a steam Rankine cycle plant and a method for operating thereof. The plant comprises a higher-pressure steam turbine with an outlet and a reheater fluidly connected to the higher-pressure steam turbine. In addition, the plant has a lower-pressure steam turbine with an inlet that is fluidly connected to the reheater. The plant also has a bypass that is fluidly connecting the outlet and the inlet so as to bypass the reheater.

20 Claims, 1 Drawing Sheet

STEAM RANKINE PLANT

TECHNICAL FIELD

The present disclosure relates generally to steam Rankine cycle plants used to generate electricity and more specifically to the quality of steam feed to the steam turbines of such plants.

BACKGROUND INFORMATION

The vast majority of contemporary utility-scale solar thermal power plants and many other thermal energy plants are based on Rankine cycle (steam-turbine) technology using conventional steam-cycle technology. In order to ensure maximum efficiency, the Rankine cycle of these plants typically includes series of steam turbines arranged in order of decreasing operating pressure wherein the exhaust of the highest pressure steam turbines is used as the feed of the next highest pressure steam turbine.

Depending on inlet steam conditions in front of the first steam turbine, as steam is expanded through a series of turbines, the steam exhaust of the steam turbine in front of the lowest pressure turbine may be saturated. This creates the problem of water droplet erosion of blades within the lowest pressure steam turbine. A solution, described in US application number US2011/0247329, is to apply reheat to the exhaust stream so as to ensure only superheated steam is fed to each turbine.

In particular when the energy source is concentrated solar energy utilising direct steam arrangements, reheat and superheat adds significant complexity to the plant. Therefore, despite the advantages of reheat, it may be preferable to design a plant with no or minimal reheat. In such cases, a solution to erosion is desirable.

SUMMARY

A steam Rankine cycle plant with a pressure series of steam turbine is provided. The plant is configured to minimise the amount of wet steam fed to downstream steam turbines while minimising reheat equipment requirements.

It attempts to address this problem by means of the subject matters of the independent claims. Advantageous embodiments are given in the dependent claims.

An aspect provides a steam Rankine cycle plant that has:
a higher-pressure steam turbine with an outlet for exhausting exhaust steam;
a reheater fluidly connect with the higher-pressure steam turbine;
a lower-pressure steam turbine, with an inlet in fluidly connected to the reheater; and
a bypass fluidly connecting the outlet of the higher-pressure steam turbine and the inlet of the lower pressure steam turbine so as to bypass the reheater.

In this way, only a portion of the steam is feed to the reheater, reducing the size of the reheater as well as reducing pressure losses resulting in higher pressure steam being fed to the lower-pressure steam turbine thus improving cycle efficiency.

In a further aspect, the higher-pressure steam turbine has an intermediate stage wherein the reheater is fluidly connected to the intermediate stage so as to extract steam from the intermediate stage. By extracting steam from an intermediate stage of the higher-pressure steam turbine, more pressure drop is available for the reheater thus enabling improved fluid balance control between the reheater and the bypass.

In another aspect the outlet of the higher-pressure steam turbine is fluidly connected to the reheater so as to enable exhaust steam from the higher-pressure steam turbine to be fed to the reheater. This solution provides a simplified solution that does away with the need for intermediate stage steam extraction.

A further aspect includes a controller that is configured and arranged to vary a flow ratio defined as the flow ratio of steam passing through the reheater to steam passing through the bypass. In this way, the amount of super heat can be optimised to the required level necessary to minimise moisture erosion in the lower pressure steam turbine. This makes it possible to most efficiently utilise the energy source available to the superheat. This is particularly important when the energy source is concentrated solar energy due to the variable nature of insolation limiting the adjustably and consistency of the energy input to the reheater.

A further aspect includes a measurement device located downstream of the bypass. The measurement device is configured and arranged to measure the amount of superheat in the steam fed to the lower pressure steam turbine. This measurement is further used in another aspect by a controller to adjust the flow ratio between the reheater and the bypass, thus ensuring the quality of the steam fed to the lower-pressure steam turbine can be controlled within tight limits.

In another aspect, a water extraction unit is fluidly located between the higher-pressure steam turbine and reheater. This arrangement minimise the latent heat energy requirements of the reheater which, for a given energy input, increases the amount of superheat provided by the reheater.

In another aspect, the bypass includes a water extraction unit for removing water from steam passing through the bypass. This has the advantage of minimising superheat requirements and thus reduces equipment costs and simplifying the process without sacrificing turbine reliability.

In another aspect a water extraction unit (50) is fluidly located between the higher-pressure steam turbine and reheater. This has the benefit of reducing the require heat demand of the reheater for a given degree of superheat.

Another aspect provides an operating method for a steam Rankine cycle plant comprising the steps of:
feeding steam from a higher-pressure steam turbine to the inlet of a lower-pressure steam turbine; and
superheating only a portion of the steam before it is fed to the lower-pressure steam turbine.

In an aspect, the portion of steam that is superheated is extracted from an intermediate stage of the higher-pressure steam turbine.

In another aspect, the method further includes the steps of measuring the degree of superheat in the steam as it is fed into the lower-pressure steam turbine and varying the flow ratio of steam passing through the reheater and through the bypass. In this way, tight control of the lower-pressure steam quality can be achieved.

In a further aspect, the flow ratio is varied so that the steam feed to the lower-pressure steam turbine is dry steam.

In an alternative aspect, the flow ratio is varied so that the steam feed to the lower-pressure steam turbine is superheated steam.

In another aspect, the method further includes the step of removing water from the bypass so that steam fed to the lower-pressure steam turbine, independent of the flow ratio, is essentially moisture free. This method step enables the size and therefore expense of the superheating systems to be minimised.

In a further aspect, the method includes the step of using a water extraction unit to extract water from the steam fed to the lower-pressure steam so that the steam fed to the lower-pressure steam turbine is essentially moisture free.

In another aspect, the method includes the step of using a water extraction unit to extract water from the steam before it passes through the reheater.

It is a further object of the invention to overcome or at least ameliorate the disadvantages and shortcomings of the prior art or provide a useful alternative.

Other aspects and advantages of the present disclosure will become apparent from the following description, taken in connection with the accompanying drawings, which by way of example, illustrate exemplary embodiments of the present invention.

BRIEF DESCRIPTION OF THE DRAWINGS

By way of example, an embodiment of the present disclosure is described more fully hereinafter with reference to the accompanying drawings, in which.

DETAILED DESCRIPTION

Figure 1:
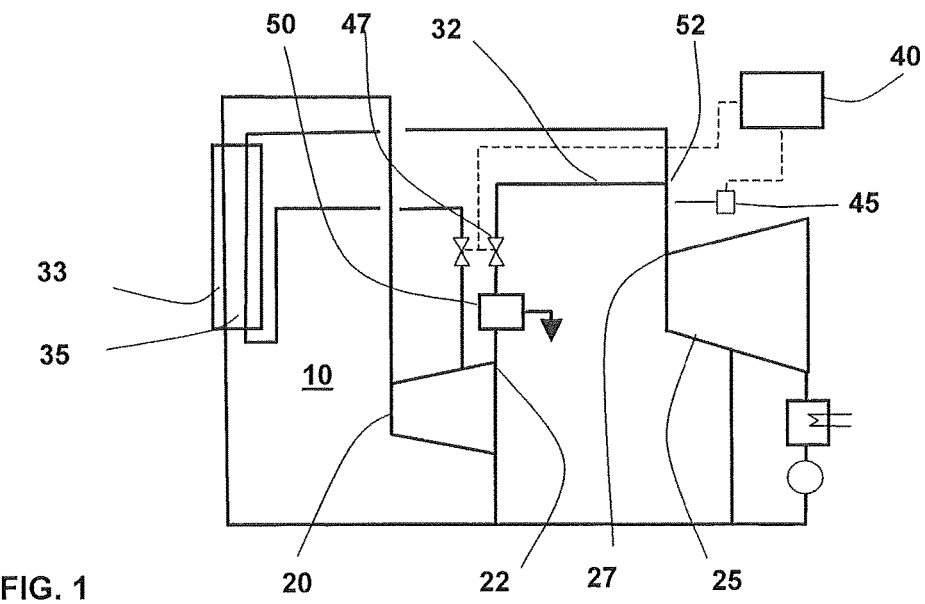
FIG. 1 is a schematic of a steam Rankine cycle plant showing exemplary embodiments.

Exemplary embodiments of the present disclosure are now described with reference to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiments disclosed herein.

Within this specification, a Rankine cycle is taken to mean the heat conversion cycle generally known as the energy cycle named after William John Macuquorn Rankine. As it is generally known that the cycle is not strictly limited to using water/steam as the heat transfer medium, the designation steam Rankine cycle defines the Rankine cycle as one that uses water/steam as the heat transfer medium.

Within this specification, reference is made to essentially moisture free steam, dry steam and superheated steam. Essentially moisture free steam is taken to mean saturated steam in equilibrium with heated water at the same temperature in which there is essentially no free water. In contrast, dry steam is taken to mean saturated steam that has been very slightly superheated to a level sufficient to avoid condensation problems without appreciably changing the energy content of the steam. This may entail superheating the steam only a few degrees. The actual degree of superheat is installation dependent. Superheated heated steam, unlike dry steam, has a significantly higher temperature that saturated steam at the same pressure such that there is an appreciable change in energy content of the superheated steam as compared to saturated steam.

In addition, reference is made in varies parts of this specification to upstream and downstream. This designation is made in reference to the nominal operating flow direction during normal operation of the plant and therefore does not change due to transients or abnormal conditions, including when the plant is shut down for maintenance.

FIG. 1 shows various exemplary embodiments that have been combined into a singular steam Rankine cycle plant 10. As shown in FIG. 1, an exemplary embodiment of a plant 10 comprises a steam Rankine cycle having a boiler 33 that feeds a higher-pressure steam turbine 20. A reheater 35, fluidly located between an intermediate stage of the higher-pressure steam turbine and a lower-pressure steam turbine 25, adds superheat to extraction steam taken from an intermediate stage of the higher-pressure steam turbine and directs it into the inlet 27 of the lower-pressure steam turbine 25. In this specification extraction steam is defined as steam that has been taken from an intermediate stage of a steam turbine. It therefore differentiates itself from exhaust steam taken from the outlet 22 after it has passed the last stage of the steam turbine, by the point from which it leaves the steam turbine. In addition, a bypass line connects the outlet 22 i.e. the exhaust, of the higher-pressure steam turbine 20 to the inlet 27 of the lower-pressure steam turbine 25.

Figure 2:
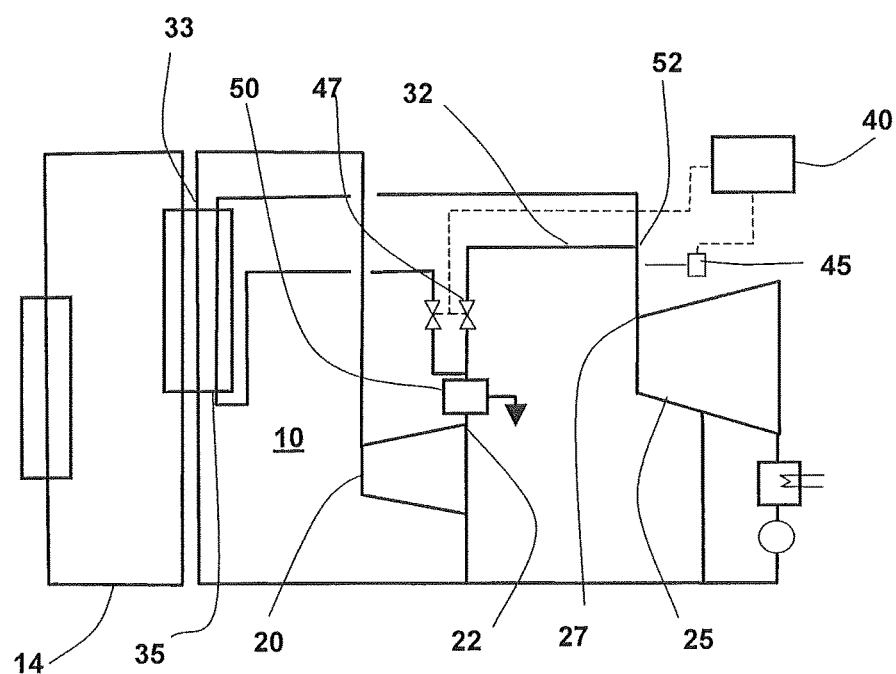
FIG. 2 is a schematic of the plant of FIG. 1 with a heat transfer cycle.

FIG. 2 shows an exemplary embodiment of a plant 10 that comprises a steam Rankine cycle having a boiler 33 feeding a higher-pressure steam turbine 20. A reheater 35, fluidly located between the outlet 22 of the higher-pressure steam turbine 20 and the inlet 27 of a lower-pressure steam turbine 25, adds superheat to steam taken from the exhaust of the higher-pressure steam turbine 20, and directs it into the inlet 27 of the lower-pressure steam turbine 25. In addition, a bypass line connects the outlet 22, i.e. the exhaust, of the higher-pressure steam turbine 20 to the inlet 27 of the lower-pressure steam turbine 25. The boiler 33 and the reheater 35 are thermally connected to a heat transfer cycle 14.

In a not shown exemplary embodiment combining the features of the exemplary embodiments shown in FIGS. 1 and 2, the boiler 33 is part of a direct thermal cycle while the reheater 35 is part of an indirect thermal cycle that uses a heat transfer cycle 14 as the thermal energy source.

In another not shown exemplary embodiment, combining the features of the exemplary embodiments shown in FIGS. 1 and 2, the reheater 35 is part of a direct thermal cycle while the boiler 33 is part of an indirect thermal cycle that uses a heat transfer cycle 14 as the thermal energy source.

In each of these exemplary embodiment thermal energy may be supplemented, in both the direct cycle of FIG. 1 and the indirect cycle of FIG. 2, with additional energy sources including but not limited to wind, wave, tidal, geothermal, nuclear and fossil fuels or from stored energy sources, including but not limited to molten salt and oil based systems.

The described exemplary embodiments are not limited to having two steam turbines. For example, exemplary embodiments may have more than two turbines of differing pressures, including, for example, high pressure, medium pressure and a low pressure. In each case, the next lower-pressure steam turbine 25 from a higher-pressure steam turbine is defined in this specification as the lower-pressure turbine 25. This can be illustrated by taking the not shown configuration of a plant 10 having high-pressure, intermediate-pressure and low-pressure steam turbines. Using this example, in an exemplary embodiment, the higher-pressure steam turbine is the higher-pressure steam turbine 20 of this disclosure and the intermediate-pressure steam turbine is the lower pressure steam turbine 25 of this disclosure. In another, equally applicable exemplary embodiment, the intermediate-pressure steam turbine is the higher-pressure steam turbine 20 and the low-pressure steam turbine is the lower-pressure steam turbine 25 of this disclosure. The higher/lower pressure coupling is therefore based on exhaust/feed arrangement and not the absolute location within a series of turbines and it typically selected based on the likelihood of that the exhaust of the higher pressure steam turbine is saturated.

In another not shown exemplary embodiment, at least one steam turbine is arranged in parallel. That is, the exemplary embodiment includes, for example, two lower-pressure steam turbines or two higher-pressure steam turbines 20. In this exemplary embodiment, the outlet 22 of at least one higher-pressure steam turbine 20 is fluidly connected to the inlet 27 of at least one lower-pressure steam turbine 25 by a bypass 32 and at least one intermediate stage of the at least one higher-pressure steam turbine 20 is fluidly connected to a reheater 35 and the inlet of at least one lower-pressure steam turbine 25.

In the exemplary embodiment shown in FIG. 1, the reheater 35 is configured to receive solar energy as a heat source. Typically, this can be achieved by the reheater 35 being a linear solar concentrator or a point source solar concentrator or else by the reheater 35 receiving a heat transfer fluid that has been heated by a linear solar concentrator or a point source solar concentrator.

An exemplary embodiment shown in FIG. 2 includes the optional feature of a measurement device 45 located in the downstream of mixing point 52 where steam from the bypass 32 mixes with steam from the reheater 35. A purpose of the measurement device 45 is to measure the amount of superheat in the steam feed to the lower-pressure steam turbine 25. Preferably, the measurement device 45 is located close to the inlet 27 of the lower-pressure steam turbine 25 so that a realistic measure of the quality of the steam fed to the lower-pressure steam turbine 25 can be assessed without additional interpretation or calculation. In the exemplary embodiment, the measurement device 45 is capable of measuring the difference between saturated steam, dry steam and superheated steam. In an exemplary embodiment, the measurement device 45 measures both temperature and pressure to an accurate enough level to be able to differentiate different grades and quality of steam.

An exemplary embodiment shown in FIG. 1 and FIG. 2 has a controller 40 for controlling the flow ratio of steam passing through the reheater 35 and the bypass 32. This is achieved, in an exemplary embodiment, by the controller 40 being configured and arranged to receive a measurement signal from the measurement device 45, perform a control algorithm calculation and adjust a control element, such as a control valve 47 capable of adjusting the flow ratio. Such a control valve 47 may include more than one valve. In an exemplary embodiment, the controller 40 is configured to ensure dry steam is fed to the inlet 27 of the lower-pressure steam turbine 25. In another exemplary embodiment, the controller 40 is configured to ensure superheated steam is fed to the inlet of the lower-pressure steam turbine 25.

An exemplary embodiment shown in FIG. 1 and FIG. 2 further includes the optional feature of a water extraction unit 50 located in the bypass 32. The purpose of the water extraction unit 50 is to remove water from steam as it leaves the higher-pressure steam turbine 20 before it enters the lower-pressure steam turbine 25. In another exemplary embodiment the water extraction unit 50 is configured to ensure essentially moisture free steam is fed to the lower-pressure steam turbine 25. In another exemplary embodiment, this is achieved by adjusting the flow ratio of steam flowing through the reheater 35 and bypass 32 respectively.

In an exemplary embodiment shown in FIG. 2, a water extraction unit is located fluidly between the higher-pressure steam turbine 20 and the reheater 35.

An exemplary operating method for a steam Rankine cycle plant 10 includes feeding steam from a higher-pressure steam turbine 20 to a lower-pressure steam turbine 25, and superheating only a portion of the steam. In an exemplary embodiment, the fed steam comprises a combination of extraction steam and exhaust steam. In another exemplary embodiment, the fed steam comprise only exhaust steam.

In an exemplary method, the superheating is performed using concentrated solar energy means as the energy source. Such means includes superheating steam using a linear solar concentrator or a point source solar concentrator or else using a heat transfer fluid heated by a linear solar concentrator or a point source solar concentrator.

In an exemplary method, the flow ratio is adjusted to achieve a targeted lower-pressure steam turbine feed condition based on measuring the degree of superheat in the steam from the higher-pressure steam turbine 20. In an exemplary method, the feed condition is dry steam. In other exemplary method, the feed condition is a superheated steam.

In an exemplary method, in addition to varying the flow ratio of steam passing through the reheater 35 and bypass 32, the method includes the step of extracting water from the steam fed to the lower-pressure steam by a water extraction unit 50. This enables steam to be fed to the lower-pressure steam turbine 25 in an essentially moisture free condition.

Although the disclosure has been herein shown and described in what is conceived to be the most practical exemplary embodiment, it will be appreciated by those skilled in the art that the present disclosure can be embodied in other specific forms. For example, the various exemplary embodiments may be applied to different thermal plants including those based on thermal solar energy, waste incineration, and biomass. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

The invention claimed is:

1. A steam Rankine cycle plant, comprising:
    a higher-pressure steam turbine with an outlet for exhausting exhaust steam;
    a reheater fluidly connected to the higher-pressure steam turbine;
    a lower-pressure steam turbine, with an inlet fluidly connected to the reheater; and
    a bypass fluidly connecting the outlet of the higher-pressure steam turbine and the inlet of the lower-pressure steam turbine so as to bypass the reheater,
    wherein the higher-pressure steam turbine includes an intermediate stage and the reheater is fluidly connected to the intermediate stage so as to enable an extraction of extraction steam from the intermediate stage and direct it to the reheater, and
    wherein the extraction steam is extracted from the higher-pressure steam turbine, before the extraction steam leaves a last stage of the higher-pressure steam turbine as the exhaust steam via the outlet of the higher-pressure steam turbine.

2. The plant according to claim 1, wherein the outlet of the higher-pressure steam turbine is fluidly connected to the reheater so as to enable the exhaust steam from the higher-pressure steam turbine to be fed to the reheater.

3. The plant according to claim 2, further comprising:
a controller configured and arranged to vary a flow ratio defined as a ratio of steam passing through the reheater to steam passing through the bypass.

4. The plant according to claim 2, further comprising:
a measurement device, located in a line downstream of the bypass, configured and arranged to measure the superheat of steam fed to the lower-pressure steam turbine.

5. The plant according to claim 2, further comprising:
a water extraction unit fluidly located between the higher-pressure steam turbine and the reheater.

6. The plant according to claim 1, further comprising a controller that is configured and arranged to vary a flow ratio defined as a ratio of steam passing through the reheater to steam passing through the bypass.

7. The plant according to claim 6, wherein the controller is configured to adjust the flow ratio based on measurements taken by a measurement device.

8. The plant according to claim 6, further comprising:
a measurement device, located in a downstream of the bypass, configured and arranged to measure the superheat of steam fed to the lower-pressure steam turbine.

9. The plant according to claim 6, further comprising:
a water extraction unit fluidly located between the higher-pressure steam turbine and the reheater.

10. The plant according to claim 1, further comprising a measurement device, located in a line downstream of the bypass, configured and arranged to measure an amount of superheat in the steam fed to the lower-pressure steam turbine.

11. The plant according to claim 10, further comprising a controller is configured to adjust a flow ratio defined as a ratio of steam passing through the reheater to steam passing through the bypass based on measurements taken by the measurement device.

12. The plant according to claim 1, further comprising a water extraction unit that is fluidly located between the higher-pressure steam turbine and the reheater.

13. The plant according to claim 1, wherein the bypass includes a water extraction unit for removing water from steam in the bypass.

14. An operating method for a steam Rankine cycle plant, comprising the steps of:
feeding, by a bypass, steam from a higher-pressure steam turbine to an inlet of a lower-pressure steam turbine; and
superheating, by a reheater, a portion of the steam before it is fed to the lower-pressure steam turbine, wherein the portion of the steam that is superheated is extracted from an intermediate stage of the higher-pressure steam turbine and directed to the reheater,
wherein the portion of the steam is extracted from the higher-pressure steam turbine, before the extracted portion of the steam leaves a last stage of the higher-pressure steam turbine as an exhaust steam via an outlet of the higher-pressure steam turbine.

15. The method according to claim 14, further comprising:
measuring a degree of superheat in the steam as it is fed to the lower-pressure steam turbine; and
varying a flow ratio defined as a ratio of steam passing through the reheater to steam passing through the bypass.

16. The method according to claim 15, further comprising:
extracting, by a water extraction unit, water from the bypass so that the steam fed to the lower-pressure steam turbine, independent of the flow ratio, is moisture free.

17. The method according to claim 15, further comprising:
extracting, by a water extraction unit, water from the steam before it passes through the reheater.

18. The method according to claim 15, further comprising:
varying the flow ratio so that the steam fed to the lower-pressure steam turbine is dry steam.

19. The method according to claim 15, further comprising:
varying the flow ratio so that the steam fed to the lower-pressure steam turbine is superheated steam.

20. An operating method for a steam Rankine cycle plant comprising:
extracting a portion of steam, before the steam leaves a last stage of a higher-pressure steam turbine via an outlet of the higher-pressure steam turbine;
superheating the extracted portion of the steam; and
feeding to a lower-pressure steam turbine, the superheated portion of the steam along with a remaining portion of the steam that leaves via the outlet of the higher-pressure steam turbine.

* * * * *